US012790126B2

(12) United States Patent
Robbe et al.

(10) Patent No.: US 12,790,126 B2
(45) Date of Patent: Nov. 10, 2026

(54) CONVEYOR ASSEMBLY

(71) Applicant: QC Industries LLC, Batavia, OH (US)

(72) Inventors: Zachary L. Robbe, Cincinnati, OH (US); Christopher J. Berardinis, Maineville, OH (US); Brandon S. Fisher, Batavia, OH (US)

(73) Assignee: QC Industries LLC, Batavia, OH (US)

( * ) Notice: Subject to any disclaimer, the term of this patent is extended or adjusted under 35 U.S.C. 154(b) by 50 days.

(21) Appl. No.: 19/041,112

(22) Filed: Jan. 30, 2025

(65) Prior Publication Data

US 2025/0243005 A1 Jul. 31, 2025

Related U.S. Application Data

(60) Provisional application No. 63/627,215, filed on Jan. 31, 2024.

(51) Int. Cl.

| | |
|---|---|
| ***B65G 21/06*** | (2006.01) |
| ***B65G 15/62*** | (2006.01) |
| ***B65G 21/10*** | (2006.01) |
| *B65G 15/46* | (2006.01) |
| *B65G 15/64* | (2006.01) |
| *B65G 23/44* | (2006.01) |

(52) U.S. Cl.

CPC ............. *B65G 21/06* (2013.01); *B65G 15/62* (2013.01); *B65G 21/105* (2013.01); *B65G 15/46* (2013.01); *B65G 15/64* (2013.01); *B65G 23/44* (2013.01); *B65G 2207/30* (2013.01)

(58) Field of Classification Search

CPC ...... B65G 21/06; B65G 15/62; B65G 21/105; B65G 15/46; B65G 15/64; B65G 23/44; B65G 2207/30

See application file for complete search history.

(56) References Cited

U.S. PATENT DOCUMENTS 4,561,538 A * 12/1985 Zwiebel ................. B65G 23/44 198/816
5,947,264 A * 9/1999 Eltvedt ................ B65G 21/105 198/816
6,161,683 A * 12/2000 Wallis .................. B65G 21/105 198/816

(Continued)

OTHER PUBLICATIONS

International Search Report and Written Opinion for Application No. PCT/US2025/013702 dated Mar. 26, 2025 (11 pages).

*Primary Examiner* — Mark A Deuble
(74) *Attorney, Agent, or Firm* — Michael Best & Friedrich LLP

(57) ABSTRACT

A conveyor assembly may include a frame assembly comprising: a pair of side rails; a plurality of cross brace members coupled to the side rails; a plurality of deck members coupled to the plurality of cross-brace members, the deck members positioned between the pair of side rails; and a tail assembly mounted at a first end of the frame assembly, the tail assembly comprising: a pair of first side plates coupled to the side rails; a pair of second side plates, where each of the second side plates is coupled to one of the first side plates, the second side plates are configured to selectively pivot with respect to the first side plates, where each of the second side plates define a slot arranged to receive a shaft; and a plurality of tail pulleys rotatably coupled to the shaft and positioned between the second side plates.

19 Claims, 12 Drawing Sheets

(56) References Cited

U.S. PATENT DOCUMENTS

| | | | | |
|---|---|---|---|---|
| 6,685,009 | B1 * | 2/2004 | Hosch | B65G 23/44<br>198/813 |
| 6,871,737 | B2 * | 3/2005 | Ertel | B65G 23/44<br>198/813 |
| 7,549,531 | B2 | 6/2009 | Hosch et al. | |
| 7,681,719 | B2 | 3/2010 | Hosch et al. | |
| 7,735,638 | B2 | 6/2010 | Hau et al. | |
| 7,874,419 | B2 | 1/2011 | Hosch et al. | |
| 9,617,078 | B2 | 4/2017 | Hall | |
| 9,751,695 | B2 * | 9/2017 | DeGroot | B65G 47/66 |
| 10,737,887 | B2 | 8/2020 | Hosch et al. | |
| 11,014,752 | B2 * | 5/2021 | Treise | B65G 15/64 |
| 11,535,455 | B1 | 12/2022 | Ertel | |
| 11,597,602 | B2 | 3/2023 | Hosch et al. | |
| 11,866,266 | B2 * | 1/2024 | Schwanitz | B65G 1/127 |
| 2006/0151294 | A1 | 7/2006 | Hosch et al. | |
| 2010/0230249 | A1 | 9/2010 | Ertel | |
| 2013/0186733 | A1 | 7/2013 | Berthelsen et al. | |
| 2017/0362034 | A1 * | 12/2017 | DeGroot | B65G 21/06 |
| 2020/0407170 | A1 * | 12/2020 | Degroot | B65G 23/22 |

* cited by examiner

CONVEYOR ASSEMBLY

CROSS-REFERENCE TO RELATED APPLICATION(S)

This patent application claims priority to U.S. Provisional Patent Application No. 63/627,215, filed Jan. 31, 2024, the entire contents of which are incorporated herein by reference.

INTRODUCTION

Conveyor assemblies commonly include a tail assembly at the first end, a head assembly at a second end, and a belt stretched across the head and tail assemblies. The head assembly transfers motion from a power source to the belt. As a result, the belt causes items placed at the first end to move towards the second end.

SUMMARY

In one aspect, a conveyor assembly is disclosed. The conveyor assembly may comprise a frame assembly comprising: a pair of side rails; a plurality of cross brace members coupled to the side rails; a plurality of deck members coupled to the plurality of cross-brace members, the deck members positioned between the pair of side rails; and a tail assembly mounted at a first end of the frame assembly, the tail assembly comprising: a pair of first side plates coupled to the side rails; a pair of second side plates, where each of the second side plates is coupled to one of the first side plates, the second side plates are configured to selectively pivot with respect to the first side plates, where each of the second side plates define a slot arranged to receive a shaft; and a plurality of tail pulleys rotatably coupled to the shaft, the plurality of tail pulleys being positioned between the second side plates.

In another aspect, a conveyor assembly is disclosed. The conveyor assembly may comprise a frame assembly comprising: a pair of side rails; a plurality of cross brace members coupled to the side rails; a plurality of deck members coupled to the plurality of cross-brace members, the deck members positioned between the pair of side rails; and a tail assembly mounted at a first end of the frame assembly, the tail assembly comprising: a pair of first side plates coupled to the side rails; a pair of second side plates, where each of the second side plates is coupled to one of the first side plates, the second side plates are configured to selectively pivot with respect to the first side plates, where each of the second side plates define a slot arranged to receive a shaft; and a plurality of tail pulleys rotatably coupled to the shaft, the plurality of tail pulleys being positioned between the second side plates; a connecting member coupled to both of the second side plates; and a belt guide coupled to the connecting member In another aspect, a conveyor assembly is disclosed. The conveyor assembly may comprise: a frame assembly comprising: a pair of side rails; a plurality of cross brace members coupled to the side rails; a plurality of deck members coupled to the plurality of cross-brace members, the deck members positioned between the pair of side rails; and a tail assembly mounted at a first end of the frame assembly, the tail assembly comprising: a pair of first side plates coupled to the side rails; a pair of second side plates, where each of the second side plates is coupled to one of the first side plates, the second side plates are configured to selectively pivot with respect to the first side plates, where each of the second side plates define a slot arranged to receive a shaft; wherein each of the first side plates comprise a top stop and a bottom stop arranged to limit a pivoting motion of the second side plates; a plurality of tail pulleys rotatably coupled to the shaft, the plurality of tail pulleys being positioned between the second side plates, a plurality of tensioning fasteners extending through the shaft and coupled to the second side plates, wherein the plurality of tensioning fasteners define an adjustment axis; and wherein the plurality of tensioning fasteners is configured to move the shaft along the adjustment axis.

DETAILED DESCRIPTION

Figure 1:
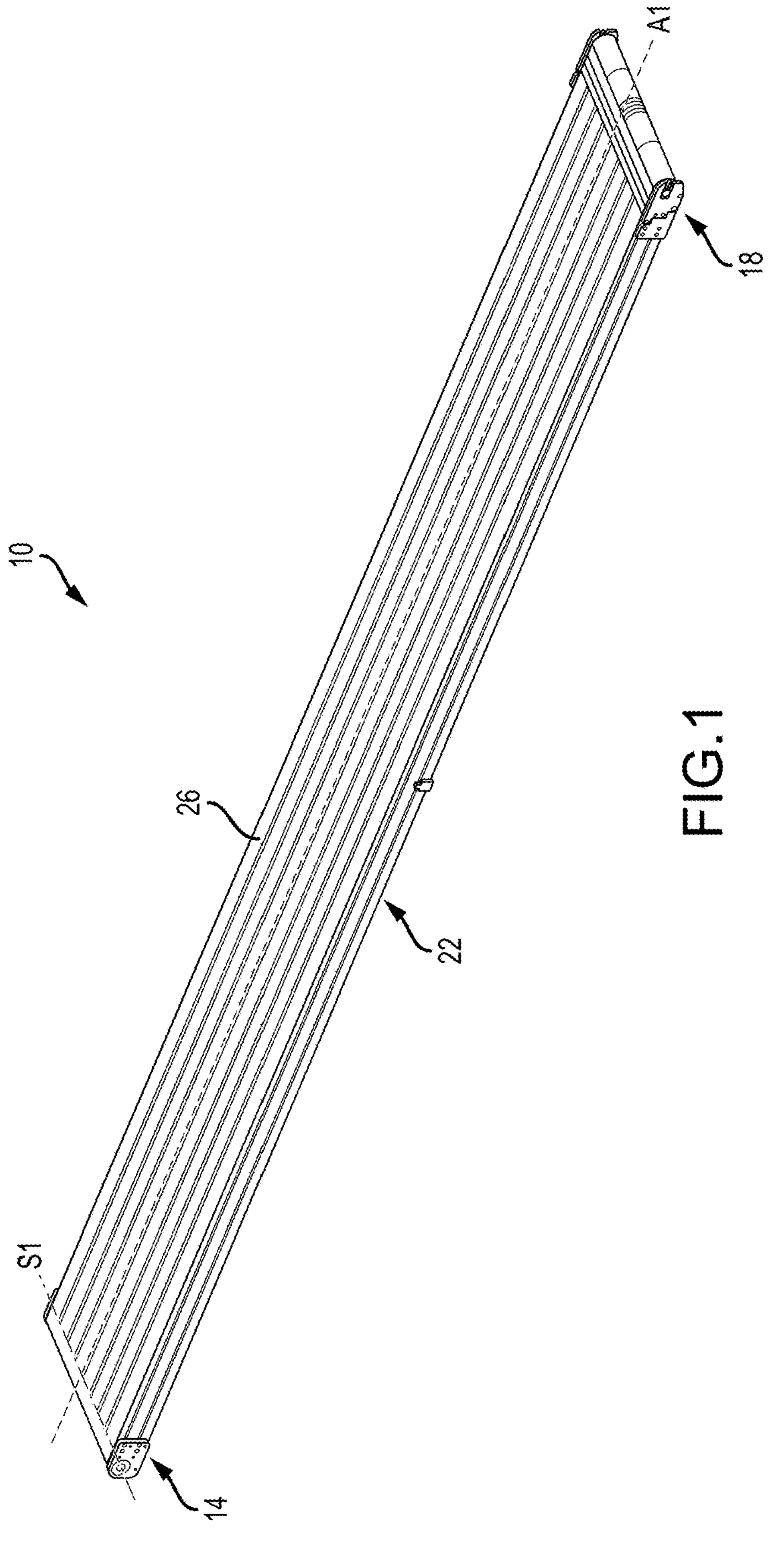
FIG. 1 illustrates a perspective view of conveyor assembly.

FIG. 1 illustrates a perspective view of conveyor assembly 10. The conveyor assembly 10 is configured to transport items from a first location to a second location. The conveyor assembly 10 comprises a head assembly 14, a tail assembly 18 at an opposing end, a frame assembly 22, and a belt 26. Other embodiments may include more or fewer components. The following discussion refers to FIGS. 1-9, unless otherwise indicated.

The head assembly 14 is coupled the frame assembly 22 and couples to a motor (not shown). The head assembly 14 is configured to transfer rotational motion of the motor to the belt 26. The head assembly 14 comprises bearing housings 30, head bearings 34, a drive pulley hub 38, a head pulley 40, a guide pulley hub 42, and an end pulley hub 46. Additional details regarding the head assembly are provided below with refence to FIGS. 2A-4.

The tail assembly 18 is coupled to the frame assembly 22 and supports a portion of the belt 26. The tail assembly 18 comprises a pair of first side plates 50, a pair of second side plates 54, a connecting member 58, a belt guide 62, a plurality of tail pulleys 64, a tail shaft 68, and a set of tail pulley bearings 70. Additional details regarding the head assembly are provided below with refence to FIGS. 5A-7.

The frame assembly 22 spans between the head assembly 14 and the tail assembly 18. The frame assembly 22 is configured to support the belt 26 and any items carried by the belt 26. The frame assembly 22 comprises a pair of side rails 72, a plurality of cross brace members 76, a plurality of deck members 80, and a plurality of idler assemblies 84. Additional details regarding the frame assembly 22 are provided below with refence to FIGS. 8, 9, and 12A-B.

The belt 26 is a continuous belt and spans between the head assembly 14 and the tail assembly 18. When installed, the belt 26 wraps around the head assembly 14 and the tail assembly 18. The belt 26 moves items across along a movement axis A1 when the motor is powered. The belt 26 may be made of fabric, urethane, nitrile rubber, PVC, silicone, or polyurethane, as examples. The belt 26 comprises a guide profile 28 formed on an inner surface of the belt 26.

Figure 2A:
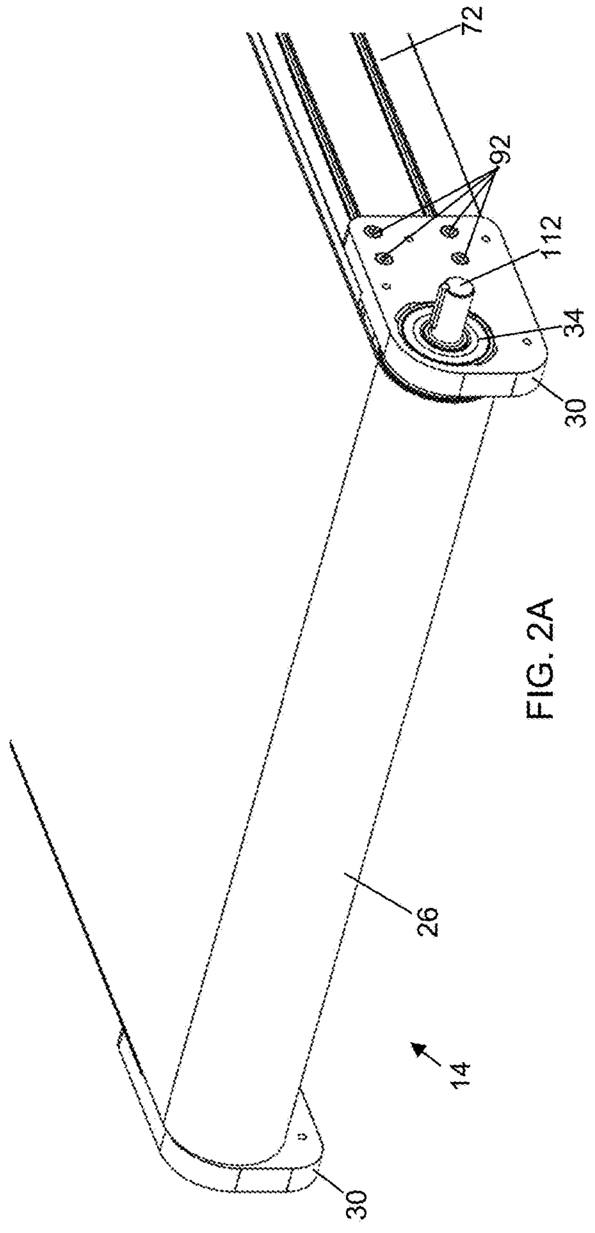
FIG. 2A illustrates a perspective view of a second end of the conveyor assembly of FIG. 1 with a belt installed.
Figure 2B:
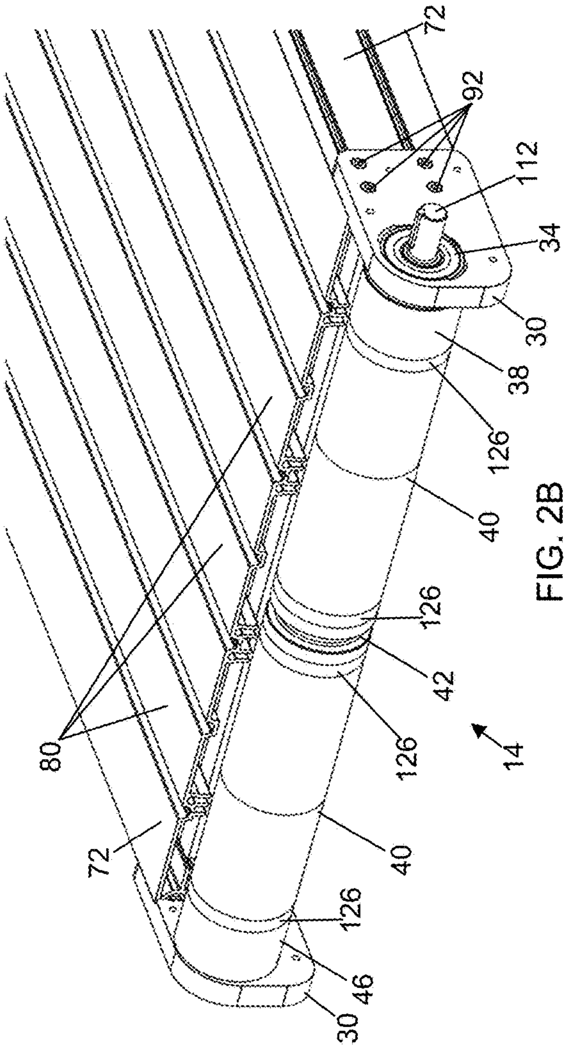
FIG. 2B illustrates a perspective view of the second end of the conveyor assembly of FIG. 2A with the belt removed.
Figure 3:
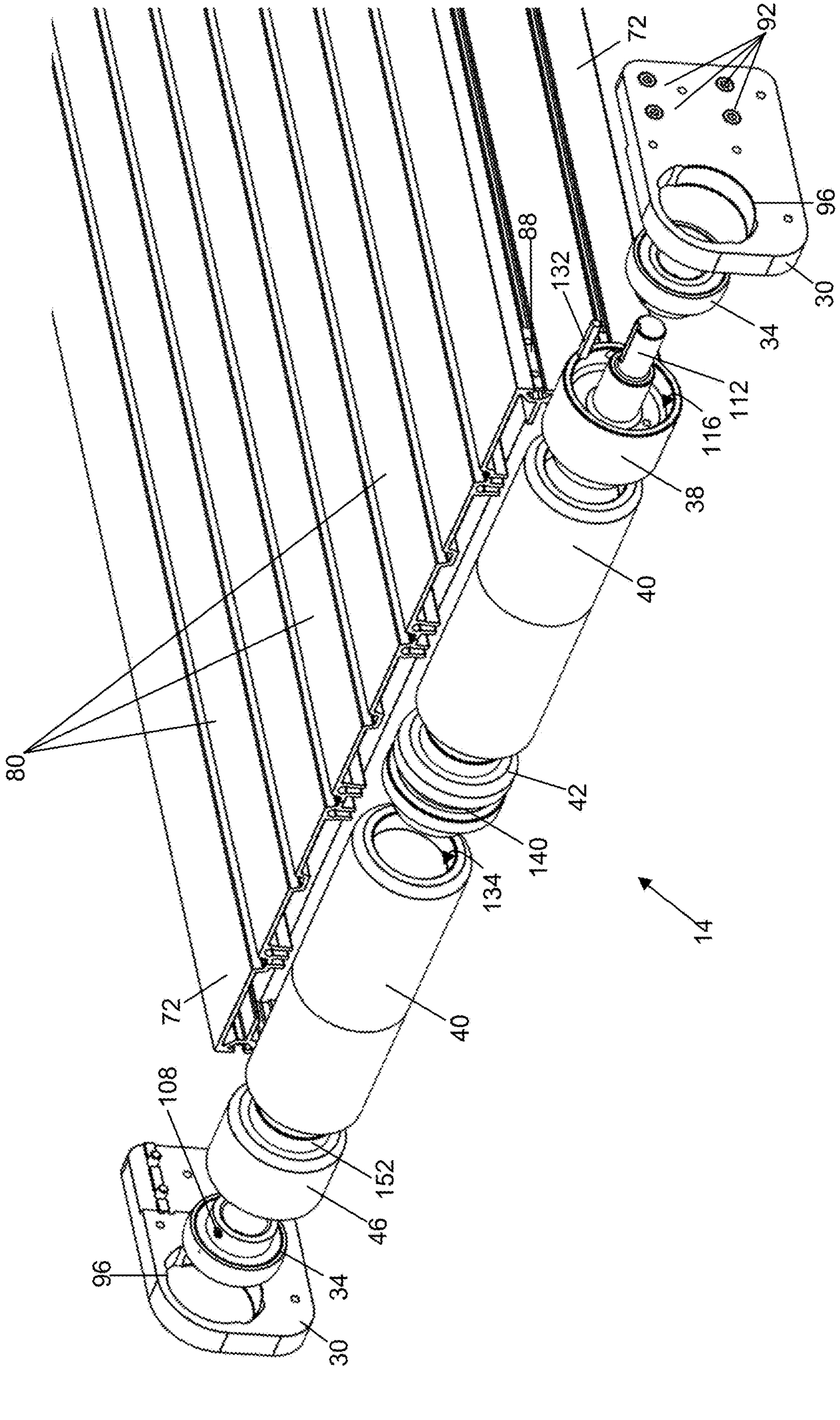
FIG. 3 illustrates an exploded view of a head assembly at the second end as shown in FIGS. 2A and 2B.
Figure 4:
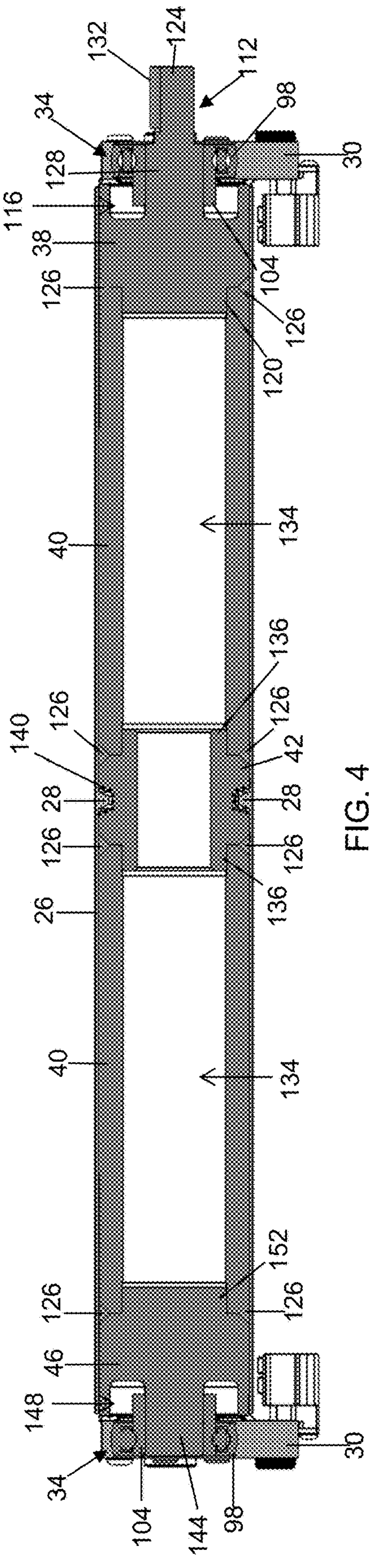
FIG. 4 illustrates a section view of the head assembly of FIG. 3 taken along line S1 in FIG. 1.

FIGS. 2A-4 illustrate the head assembly 14 and are discussed concurrently below unless otherwise indicated. FIG. 2A illustrates a perspective view of the head assembly 14 with the belt 26 installed. FIG. 2B illustrates a perspective view of the head assembly 14 with the belt 26 removed. FIG. 3 illustrates an exploded view of a head assembly 14. FIG. 4 illustrates a section view of the head assembly 14.

The bearing housings 30 define the ends of the head assembly 14 and are coupled to the side rails 72. The bearing housings 30 may be coupled to the side rails via a plurality of a T-nuts 88 and a plurality of fasteners 92, self-tapping fasteners, adhesives, or welding. The bearing housings 30 define a bearing aperture 96 configured to receive the one of the head bearings 34.

The head bearings 34 are positioned partially within the bearing housing 30 and partially within the drive pulley hub 38 or the end pulley hub 46. In the illustrated embodiment, the head bearings 34 are configured to support and allow rotation of the drive pulley hub 38, the head pulleys 40, the guide pulley hub 42, and the end pulley hub 46.

To install the head bearings 34, an outer ring 98 of the head bearings 34 may be inserted into the bearing aperture 96 of one of the bearing housings 30 and then an inner ring 104 receives a portion of either the drive pulley hub 38 or the end pulley hub 46. Once either the drive pulley hub 38 or the end pulley hub 46 is inserted, a bearing set screw 108 may be tightened to secure the head bearings 34 to either the drive pulley hub 38 or the end pulley hub 46.

The drive pulley hub 38 is positioned adjacent to one of the bearing housings 30 and one of the head pulleys 40. The drive pulley hub 38 transfers rotation from the motor to the head pulleys 40, the guide pulley hub 42, and the end pulley hub 46. The drive pulley hub 38 comprises a drive hub shaft 112, a bearing recess 116, and a first alignment feature 120.

The drive hub shaft 112 of the drive pulley hub 38 extends through the head bearings 34 and the bearing housing 30. The drive hub shaft 112 comprises a first shaft portion 124 and a second shaft portion 128.

In the illustrated embodiment, the first shaft portion 124 is keyed to receive a key 132 and has a smaller diameter than the second shaft portion 128. The first shaft portion 124 is configured to receive a portion of the motor. The keyed nature of the first shaft portion 124 may assist in transferring rotational power from the motor with minimal slipping.

The second shaft portion 128 has a diameter larger than the first shaft portion 124 and is sized to fit the inner ring 104 of the head bearings 34. When the head bearings 34 are fully seated, the bearing set screw 108 contacts the second shaft portion 128. In other embodiments, the first shaft portion 124 and the second shaft portion 128 may have an equal diameter.

The bearing recess 116 is a portion of the drive pulley hub 38 surrounding the drive hub shaft 112 and receives a portion of the head bearings 34. In the illustrated embodiment, the bearing recess 116 extends only partially through the drive pulley hub 38 and further contributes to an overall reduction of mass of the drive pulley hub 38. In other embodiments, the bearing recess 116 may be differently sized to accommodate different sized bearings and increase or decrease the mass of the drive pulley hub 38. The bearing recess 116 also further includes one or more access openings (not shown) positioned circumferentially around the bearing recess 116. The access openings allow a user to access the bearing set screw 108 from outside the bearing recess 116 to secure the head bearing 34 to the drive hub shaft 112.

The first alignment feature 120 of the drive pulley hub 38 is located on an opposing end of the drive pulley shaft 112 and the bearing recess 116. The first alignment feature 120 is inserted into an interior cavity 134 of the head pulley 40 to align the drive pulley hub 38 and head pulleys 40. Once aligned, the drive pulley hub 38 is coupled to the head pulley 40 with a weld 126, which joints the drive pulley hub 38 and the head pulley 40 for co-rotation.

The head pulleys 40 are positioned between the bearing housings 30 and are coupled to one or more of the following: the drive pulley hub 38, the guide pulley hub 42, or the end pulley hub 46. Specifically, a portion of either the drive pulley hub 38, the guide pulley hub 42, or the end pulley hub 46 is inserted into the interior cavity 134 of one of the head pulleys 40, and then the head pulley 40 is welded to a coupled component.

In operation, the head pulleys 40 contact the belt 26 and transfer rotation to the belt 26 originating from the motor. To assist in the transfer of rotation, the head pulleys 40 may include a knurled outer surface (not shown) to grip the belt 26. Additionally, the head pulleys 40 have a non-uniform diameter along a length of the head pulley 40, and specifically have a smaller diameter at the ends and a larger diameter near the center of the head pulley 40. The non-uniform diameter of the head pulley 40 assists in centering the belt 26 on the head pulley 40.

The guide pulley hub 42 is positioned centrally between the bearing housings 30 and is coupled to multiple head pulleys 40 via welds 126. Similar to the head pulleys 40, the guide pulley hub 42 is indirectly connected to the motor and is configured to rotate. The guide pulley hub 42 comprises a set of second alignment features 136, and a first guide slot 140.

The second alignment features 136 are positioned at both ends of the guide pulley hub 42 and serve a similar purpose to the first alignment feature 120 of the drive pulley hubs 38. Specifically, the second alignment features 136 are configured to be inserted into the interior cavity 134 of the head pulleys 40 for alignment. Once aligned, head pulleys 40 can be welded to the guide pulley hub 42.

The first guide slot 140 is formed circumferentially about the outside of the guide pulley hub 42. As shown in FIG. 4, the first guide slot 140 is shaped to fit the guide profile 28 of the belt 26, which assists in centering the belt 26 and reduces the risk of unexpected decoupling of the belt 26.

The end pulley hub 46 is positioned at an opposing end of the head assembly 14 as the drive pulley hub 38. The end pulley hub 46 also is received by one of the head bearings 34 and the bearing housings 30. Similar to the head pulleys 40 and the guide pulley hub 42, the end pulley hub 46 is indirectly connected to the motor through one of the welds 126. Like the drive pulley hub 38, the end pulley hub 46 comprises an end hub shaft 144, a bearing recess 148, and a third alignment feature 152.

The end hub shaft 144 of the end pulley hub 46 extends through the bearing housing 30 and the head bearing 34. When the head assembly 14 is assembled, the end hub shaft 144 is inserted into the inner ring 104 of the head bearings 34 and the bearing set screw 108 is tightened to lock the end hub shaft 144 to the inner ring 104. The end hub shaft 144 is visible in the sectional view of FIG. 4.

The bearing recess 148 of the end pulley hub 46 surrounds the end hub shaft 144 and receives a portion of the head bearings 34. In the illustrated embodiment, the bearing recess 148 extends only partially through the end pulley hub 46 and further contributes an overall reduction of mass of the end pulley hub 46. In other embodiments, the bearing recess 148 may be differently sized to accommodate different sized bearings and increase or decrease the mass of the end pulley hub 46. The bearing recess 148 also further includes one or more access openings (not shown) positioned circumferentially around the bearing recess 148. The access openings allow the user to access the bearing set screw 108 from outside the bearing recess 148 to secure the bearing to the end hub shaft 144.

The third alignment feature 152 of the end pulley hub 46 is located on an opposing end of the end hub shaft 144 and the bearing recess 148. The third alignment feature 152 is configured to be inserted into the interior cavity 134 of one of the head pulleys 40 for alignment. Once aligned, the end pulley hub 46 is coupled to the head pulley 40 via the weld 126, which allows for co-rotation of the end pulley hub 46 and the head pulley 40.

Figure 5B:
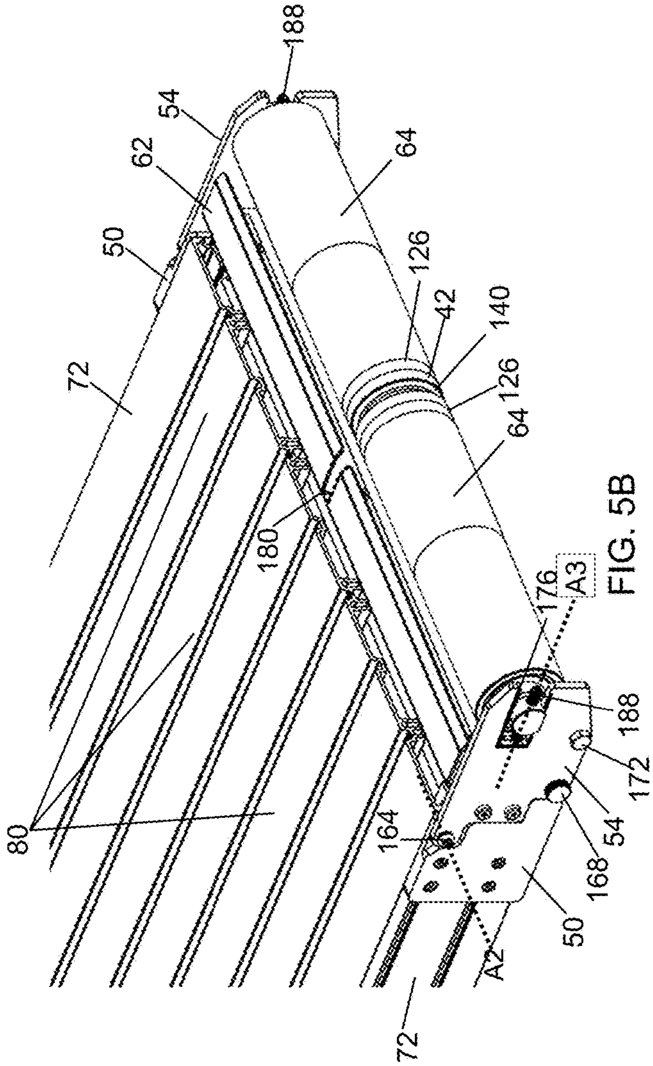
FIG. 5B illustrates a perspective view of the first end of the conveyor assembly of FIG. 5A with the belt removed.
Figure 5A:
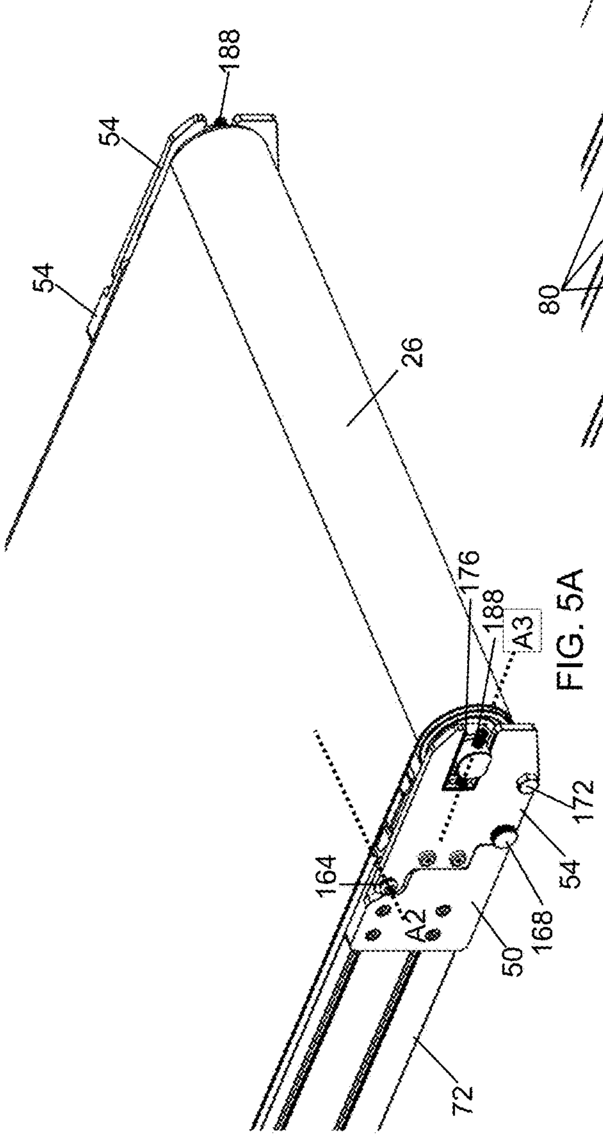
FIG. 5A illustrates a perspective view of a first end of the conveyor assembly of FIG. 1 with a belt installed.
Figure 6B:
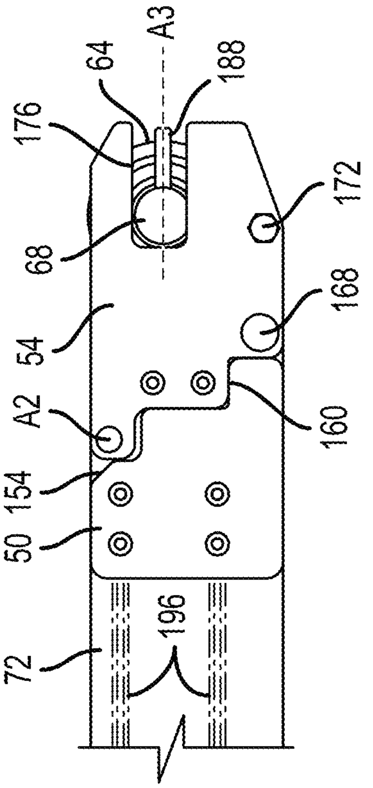
FIG. 6B illustrates a plan view of the tail assembly at the first end of FIG. 5B in an intermediate position.
Figure 6C:
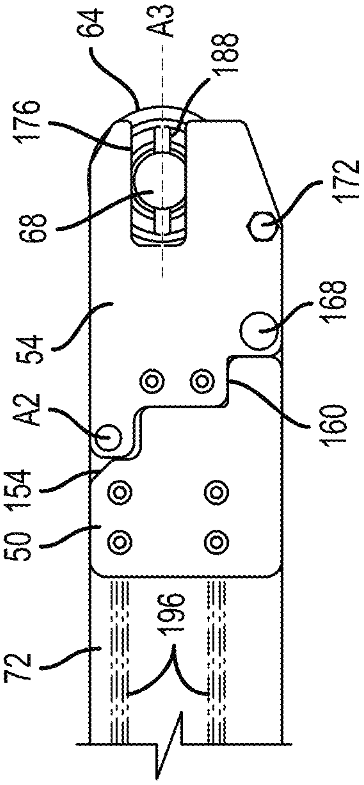
FIG. 6C illustrates a plan view of the tail assembly at the first end of FIG. 5B in an exemplary operational position.
Figure 6A:
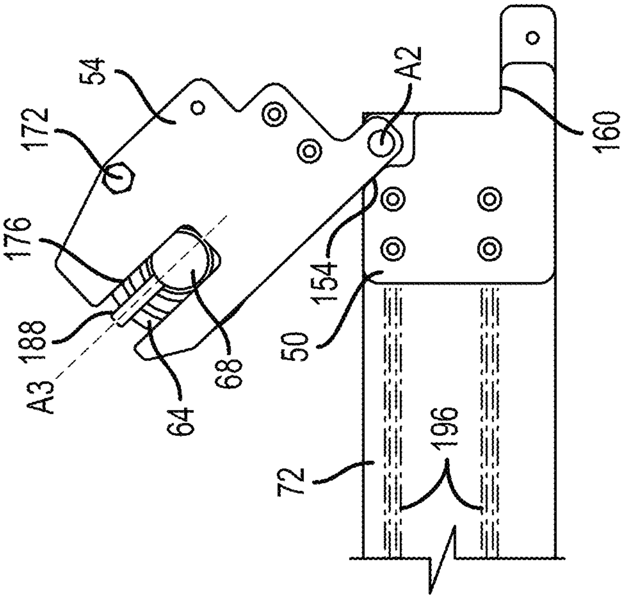
FIG. 6A illustrates a plan view of a tail assembly at the first end of FIG. 5B in a belt change position.
Figure 7:
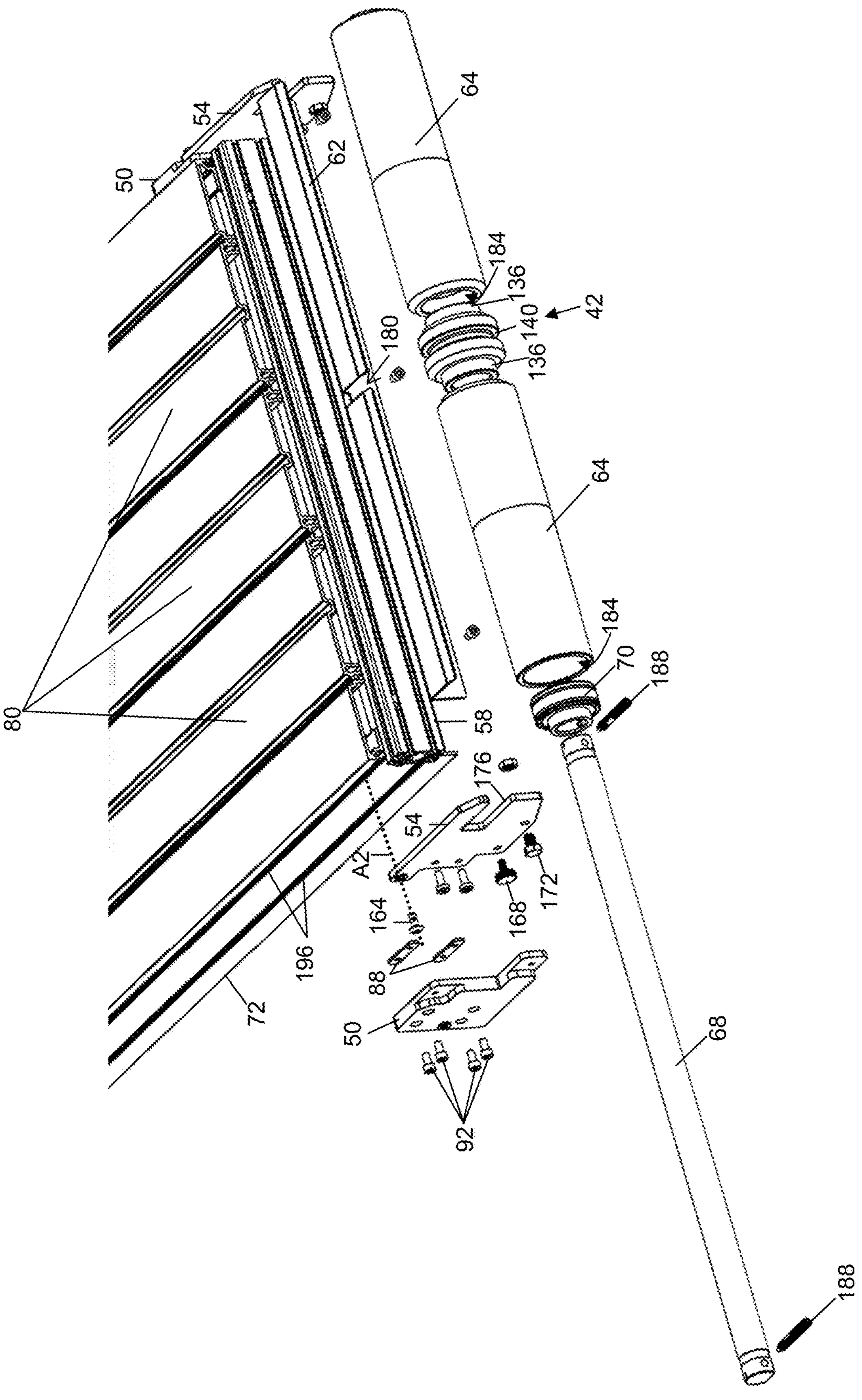
FIG. 7 illustrates a partial exploded view of the tail assembly at the first end of FIG. 5B.

FIGS. 5A-7 illustrate the tail assembly 18 and are discussed concurrently below unless otherwise indicated. FIG. 5A illustrates a perspective view of a tail assembly 18 with a belt 26 installed. FIG. 5B illustrates a perspective view of the first end of the conveyor assembly 18 of FIG. 5A with the belt 26 removed. FIG. 6A illustrates a side plan view of a tail assembly 18 in a belt change position. FIG. 6B illustrates a side plan view of the tail assembly 18 in an intermediate position. FIG. 6C illustrates a side plan view of the tail assembly 18 in an operational position. FIG. 7 illustrates a partial exploded view of the tail assembly 18.

The tail pulleys 64 are positioned between the second side plates 54 and at an opposing end of the conveyor assembly 10 from the head pulleys 40. Unlike the head pulleys 40, the tail pulleys 64 are not driven by the motor, but instead are free spinning and rotate along with the movement of the belt 26. In the illustrated embodiment, the tail assembly 18 includes two tail pulleys 64 that are joined by another guide pulley hub 42. Similar to the head assembly 14, the second alignment features 136 of the guide pulley hub 42 are inserted into an interior cavity 184 of the tail pulley for alignment, and then the guide pulley hub 42 and the tail pulley 64 are joined by the welds 126.

The first side plates 50 of the tail assembly 18 are coupled the side rails 72 of the frame assembly 22 via T-nuts 88 and fasteners 92. In other embodiments, the first side plates 50 may be coupled to the side rails 72 though self-tapping fasteners, adhesives, or welding. The first side plates 50 comprise a top stop 156 and a bottom stop 160.

As shown in FIGS. 6A-6C, the top stop 156 and the bottom stop 160 of the first side plate 50 limit the pivoting motion of the second side plate 54. In FIGS. 6B-C, the second side plate's 54 motion in the clockwise direction is limited by the bottom stop 160 to a point where the second side plate 54 is in line with the first side plate 50.

In FIG. 6A, the second side plate's 54 motion in the counterclockwise direction is limited by the top stop 156 to a position where the second side plate 54 is 200 degrees to 250 degrees from being in line with the first side plate 50. For instance, the second side plate 54 may be 225 degrees from being in line with the first side plate 50, when the second side plate 54 contacts the top stop 156. In other embodiments, the top stop 156 and the bottom stop 160 may limit the motion of the second side plate 54 to different positions.

The second side plates 54 are coupled to the first side plates 50 via shoulder bolt 164 and thumb screw 168. The second side plates 54 are also selectively pivotable about a bolt axis A2 (defined by the shoulder bolts 164), only when the thumb screws 168 are removed. The second side plates 54 comprise a user engagement member 172 and a tail shaft slot 176.

In the illustrated embodiment, the user engagement member 172 is a hex bolt and nut combination. In operation, the user engagement member 172 is acted upon by a wrench (not shown) and a force is applied to pivot the tail assembly 18 to a desired position. In other embodiments, the user engagement member 172 may be formed directly upon the second side plates 54 and the wrench may be replaced with a crowbar, a screwdriver, or a specialized tool shaped to engage the user engagement member 172.

The tail shaft slot 176 is an open-ended slot defined by the second side plate 54. The tail shaft slot 176 is configured to receive the tail shaft 68. The tail shaft slot 176 is shaped to prevent the rotation of the tail shaft 68 once installed.

As shown in FIG. 7, the connecting member 58 is coupled to both of the second side plates 54 and the belt guides 62. The connecting member 58 couples both of the second side plates 54, so both side plates 54 pivot in unison. Additionally, the connecting member 58 reduces the impact of torsion if the user only applies a force to one of the user engagement members 172 to pivot the tail assembly 18.

The belt guide 62 is positioned between the second side plates 54 and is coupled to the connecting member 58. The belt guide 62 fills a gap between the deck members 80 of the frame and the plurality of tail pulleys 64 and creates a smooth transition for the belt 26 from the deck members 80 to the tail pulleys 64. The belt guide 62 comprises a second guide slot 180.

The second guide slot 180 is formed centrally on the belt guide 62. The second guide slot 180 is shaped to fit the guide profile 28 of the belt 26, so the guide profile 28 can transition into the first guide slot 140 of the guide pulley hub 42. Additionally, in conjunction with the first guide slot 140, the second guide slot 180 of the belt guide 62 assists in retaining the belt 26 on the head and tail pulleys 40, 64.

The tail shaft 68 extends through the interior cavity 184 of the tail pulleys 64. The tail shaft 68 extends through the interior cavity 184 of the tail pulleys 64 and is coupled to the second side plate 54. Specifically, the tail shaft 68 is positioned within the tail shaft slot 176 and is coupled to the second side plates 54 via a set of tensioning fasteners 188. Additionally, in the illustrated embodiment, the tail shaft 68 is a D-shaft, but in other embodiments, the tail shaft 68 may have a hexagonal shaft, a double-D shaft, or a square shaft.

In the illustrated embodiment, the tensioning fasteners 188 are set screws and extend through the ends of the tail shaft 68 into the second side plates 54. The tensioning fasteners 188 are also configured to move the tail shaft 68 axially along an adjustment axis A3. Different positions of the tail shaft 66 are shown by FIGS. 6B and 6C. Adjustment of the tail shaft 66 also changes the distance between the tail pulleys 64 and the head pulleys 40, which in turn either increases or decreases the tension applied to the belt 26.

The tail pulley bearings 70 are positioned within the interior cavity 184 of the tail pulleys 64. The tail pulley bearings 70 support the tail pulleys 64 and allow for rotation of the tail pulleys 64 with respect to the tail shaft 68. To secure the tail pulley bearings 70 to the tail shaft 68, a plurality of set screws (not shown) is tightened to contact the tail shaft 68.

FIGS. 6A-C illustrate the range of motion of the tail assembly 18. FIG. 6A illustrates a belt change position of the tail assembly 18. FIG. 6B illustrates an intermediate position. FIG. 6C illustrates an operational position.

In the belt change position (FIG. 6A), the distance between the head pulleys 40 and the tail pulleys 64 is minimized and the tension applied to the belt 26 is also minimized. At this point, the belt 26 can be installed or removed. Once the belt 26 is installed, the user can engage the user engagement member 172 and rotate the tail assembly 18 clockwise. Once the second side plates 54 contact the bottom stop 160, the thumb screws 168 are installed to couple the second side plates 54 to the first side plates 50 and to prevent rotation of the tail assembly 18.

When the tail assembly 18 is in the intermediate position shown in FIG. 6B, the user can adjust the tensioning fasteners 188 until a desired tension on the belt 26 is achieved. Once the tensioning fasteners 188 are adjusted, the tail assembly 18 is in the operational position (FIG. 6C) and the conveyor assembly 10 can be operated.

Figure 8:
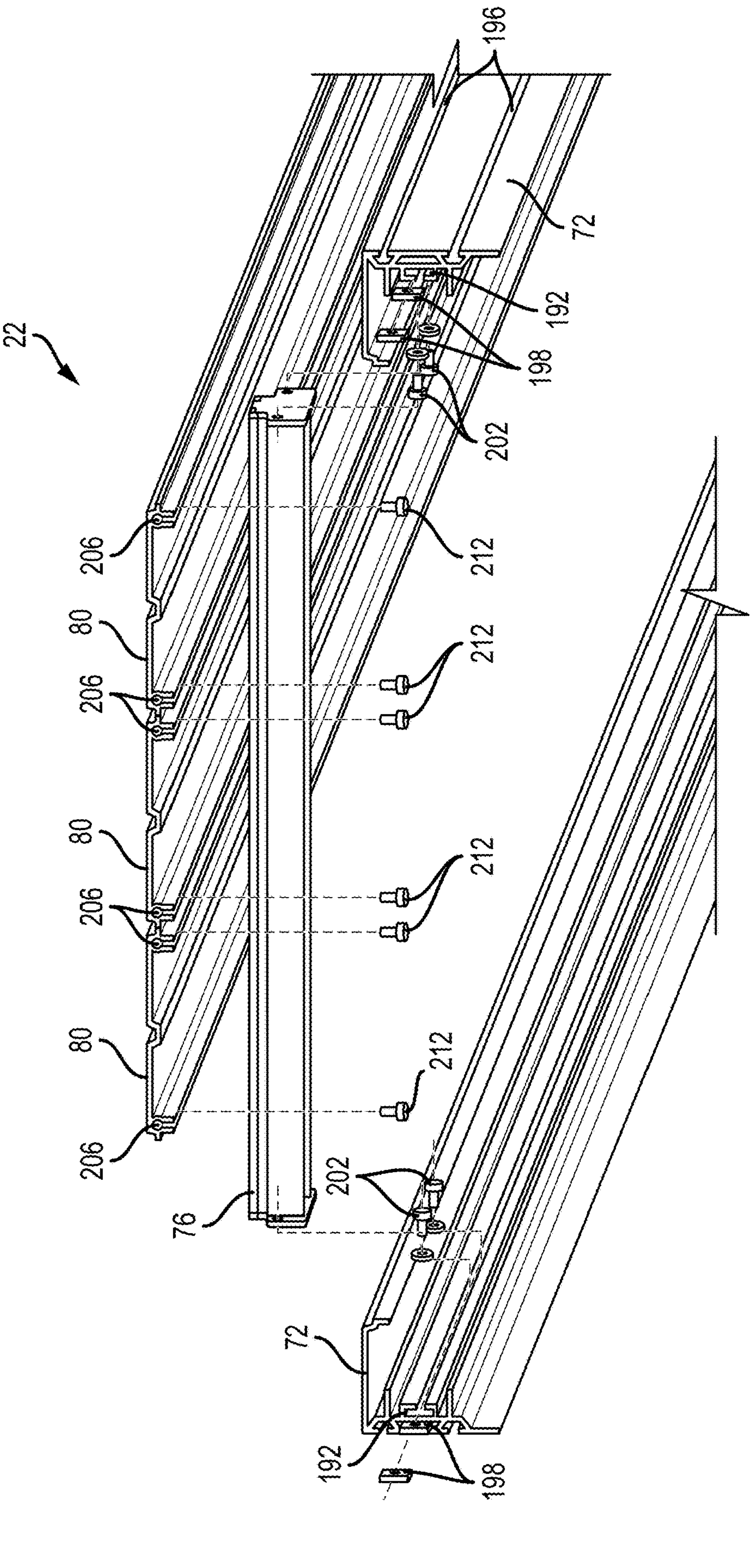
FIG. 8 illustrates an exploded view of a frame assembly of the conveyor assembly of FIG. 1.
Figure 9:
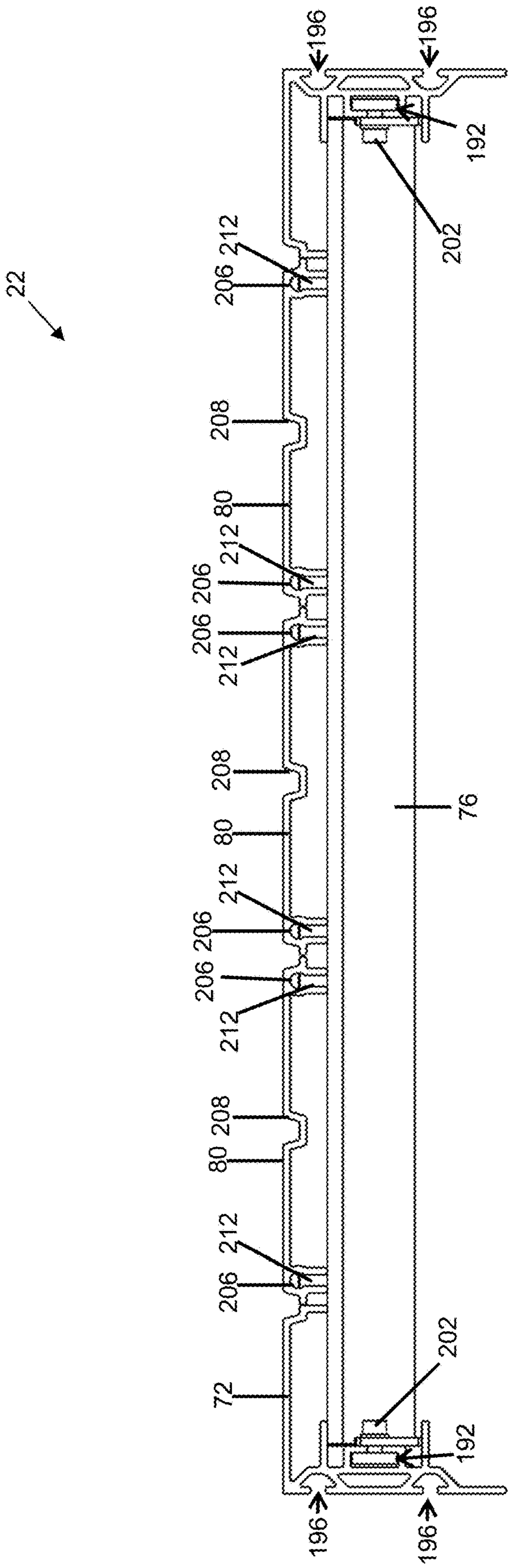
FIG. 9 illustrates a section view of the frame assembly of FIG. 8.

FIGS. 8 and 9 illustrate the frame assembly 22 and are discussed concurrently below unless otherwise indicated. FIG. 8 illustrates an exploded view of the frame assembly 22. FIG. 9 illustrates a section view of the frame assembly 22.

The pair of side rails 72 extend along the length of the conveyor assembly 10. Each side rail 72 maintains a uniform profile along the entire length of the side rail 72. In the illustrated embodiment, the side rails 72 have a substantially L-shaped cross section, but in other embodiments the cross section may be substantially C-shaped. The side rails 72 define an inward facing slot 192, and a set of outward facing slots 196.

The inward facing slot 192 has a substantially rectangular cross section and is configured to receive a second T-nut 198. The second T-nut 198 and a plurality of cross brace fasteners 202 are used to mount the cross-brace members 76 to the side rails 72. When the cross-brace fasteners 202 are partially loosened, the position of the cross-brace members 76 can be moved to various positions along the inward facing slot 192. In the illustrated embodiment, the side rails 72 include one inward facing slot 192. In other embodiments, the side rails 72 may include more than one inward facing slot 192 and the inward facing slot 192 may have a trapezoidal cross section.

The set of outward facing slots 196 are positioned on an opposing side of the side rails 72 to the inward facing slot 192. The outward facing slots 196 are configured to receive the T-nuts 88, which are used to mount the bearing housings 30, the first side plates 50, and the idler assemblies 84. In the illustrated embodiment, the side rails 72 include two outward facing slots 196 parallel to one another. In other embodiments, the side rails 72 may include a single outward facing slot 196 or more than two outward facing slots 196.

The plurality of deck members 80 are positioned between the side rails 72 and are mounted to the cross-brace members 76. The deck members 80 form a surface to support the belt 26 and any items on the belt 26. In the illustrated embodiment, the frame assembly 22 includes three deck members 80 to accommodate the width of the belt 26. In other embodiments, the number of deck members 80 may be altered to accommodate different widths of belts, as further discussed with regards to FIGS. 10 and 11. As shown in FIGS. 8 and 9, the deck members 80 have a substantially uniform cross section and define a plurality of mounting slots 206 and a third guide slot 208.

The mounting slots 206 extend along the length of the deck members 80. The mounting slots 206 are configured to receive a plurality of self-tapping fasteners 212 in a direction orthogonal to a top surface. In other embodiments, the self-tapping fasteners 212 may be received in a non-orthogonal direction to the top surface of the deck member 80. Initially, the mounting slots 206 are not threaded and have a width smaller than the diameter of the self-tapping fasteners 212. As the self-tapping fasteners 212 are screwed into the mounting slots 206, the self-tapping fasteners 212 cut threads into the mounting slots 206 and create a tapped portion (not shown). By creating the tapped portion, the self-tapping fasteners 212 couple the deck member 80 to one of the cross-brace members 76, as shown in FIG. 9.

The third guide slot 208 extends along the entire length of the deck member 80 and is shaped to receive the guide profile 28 of the belt 26. Similar to the first guide slot 140 and the second guide slot 180, the third guide slot 208 assists in centering the belt 26 and reduces the risk of unexpected decoupling of the belt 26.

As shown, the deck member 80 may define a plurality of third guide slots 208. The plurality of third guide slots 208 are defined by an upper, belt-facing surface of the deck member 80.

The plurality of cross-brace members 76 are positioned along the length of conveyor assembly 10. The plurality of cross-brace members 76 are positioned between the side rails 72 and below the deck members 80. The cross-brace members 76 are coupled to the inward facing slot 192 of the side rails 72 through the second T-nuts 198 and the cross-brace fasteners 202. The self-tapping fasteners 212, extending through a top surface of the cross-brace members 76, couple the cross-brace member 76 to the mounting slots 206 of the deck members 80.

In the illustrated embodiment, six self-tapping fasteners 212 are used to couple three deck members 80. In other embodiments, the number of self-tapping fasteners 212 may increase or decrease proportional to the number of deck members 80 included in the frame assembly 22. In some implementations, a quantity of self-tapping fasteners 212 may be twice, three times, or four times the number of deck members 80 included in the frame assembly.

Figure 10:
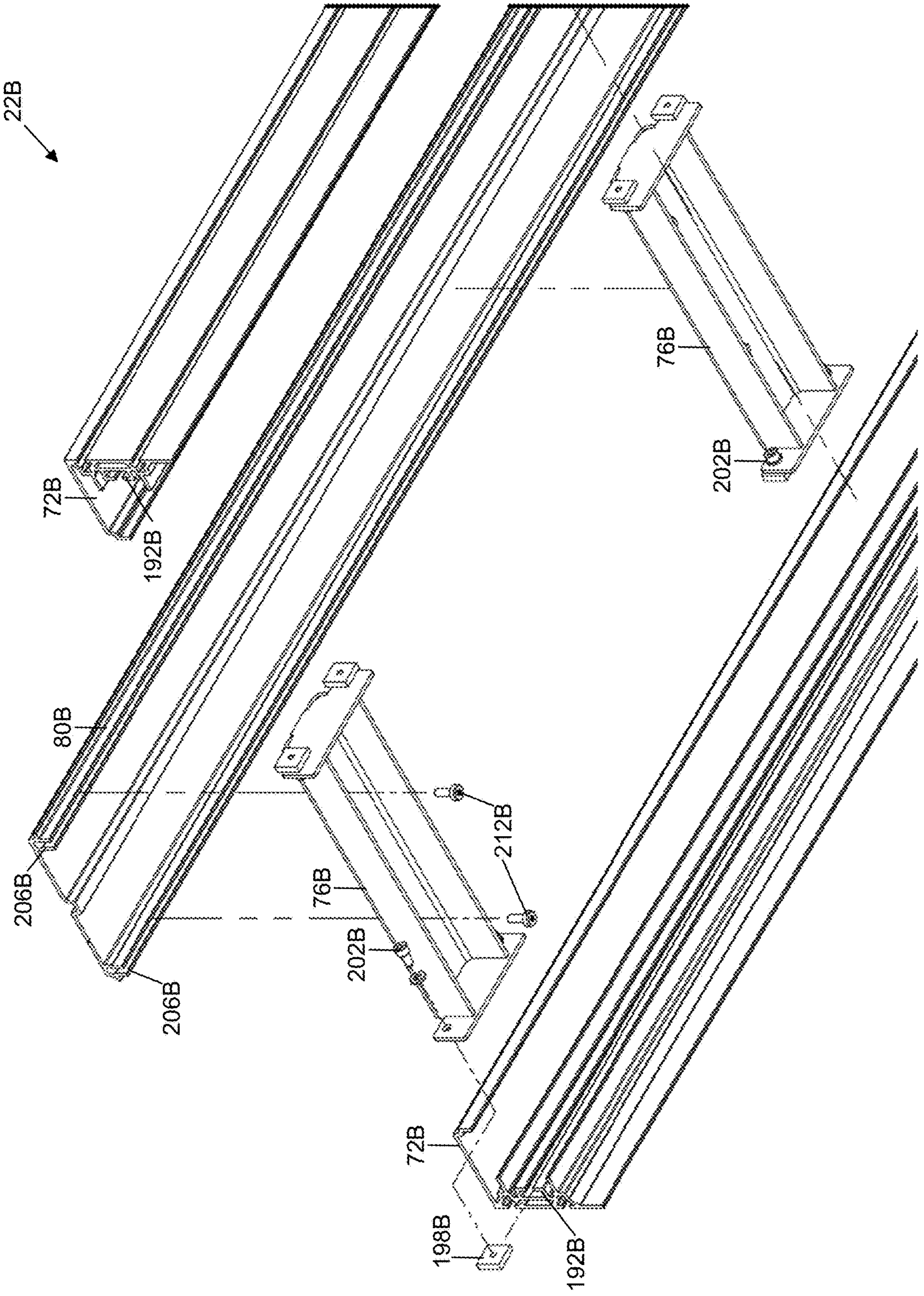
FIG. 10 illustrates an exploded view of a frame assembly of an alternate embodiment of a conveyor assembly.
Figure 11:
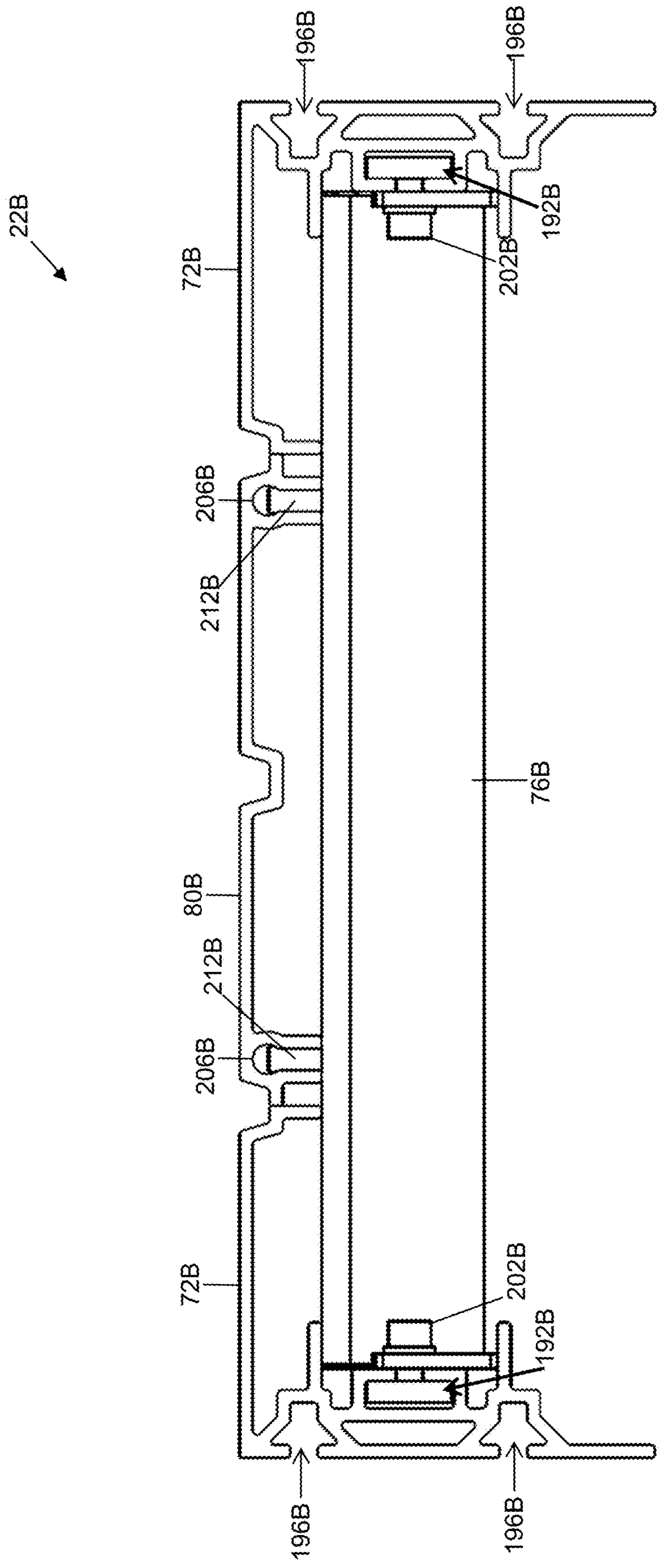
FIG. 11 illustrates a section view of the frame assembly of FIG. 10.

FIGS. 10 and 11 illustrate an alternate embodiment of a frame assembly 22B. The illustrated embodiment in FIGS. 10 and 11 have like references numerals plus "B", and have the following differences explained below. FIG. 10 illustrates an exploded view of the frame assembly 22B. FIG. 11 illustrates a section view of the frame assembly 22B.

The frame assembly 22B comprises a set of side rails 72B, a plurality of cross braces 76B, and a deck member 80B. The cross braces 76B are coupled to an inward facing slot 192B of the side rails 72B through a plurality of second T-nuts 198B and a plurality of cross brace fasteners 202B. The cross braces 76B are also coupled to a set of mounting slots 206B through a plurality of self-tapping fasteners 212B. Compared to the cross-brace members 76 of the frame assembly 22, the cross braces 76B are shorter in length due to the inclusion of the single deck member 80B, which reduces the distance between the side rails 72B. Additionally, each cross brace 76B is only secured using two self-tapping fasteners 212 to the deck member 80B.

Figure 12B:
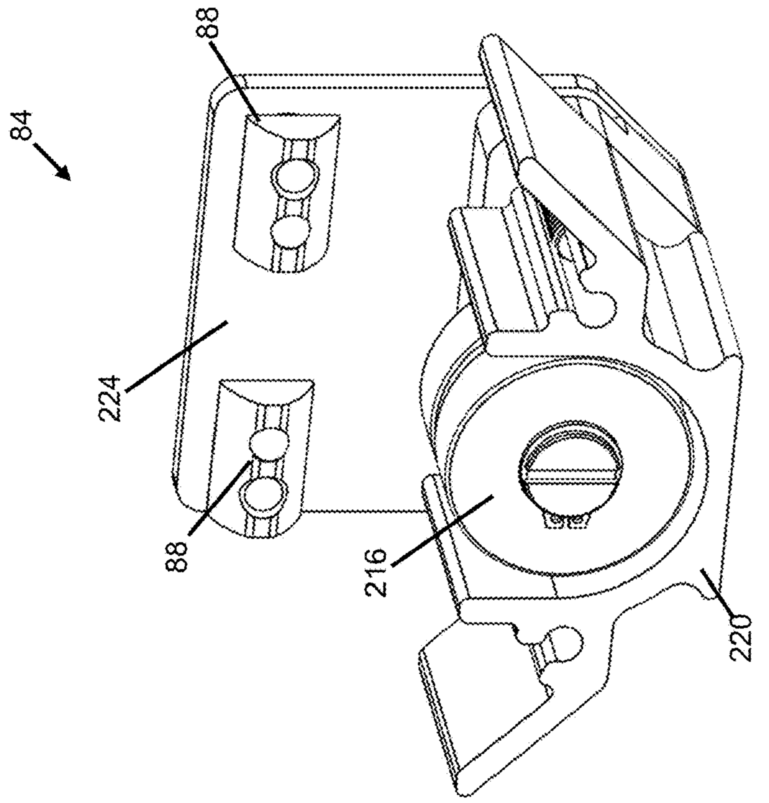
FIG. 12B illustrates a perspective view of the idler assembly of FIG. 12A.
Figure 12A:
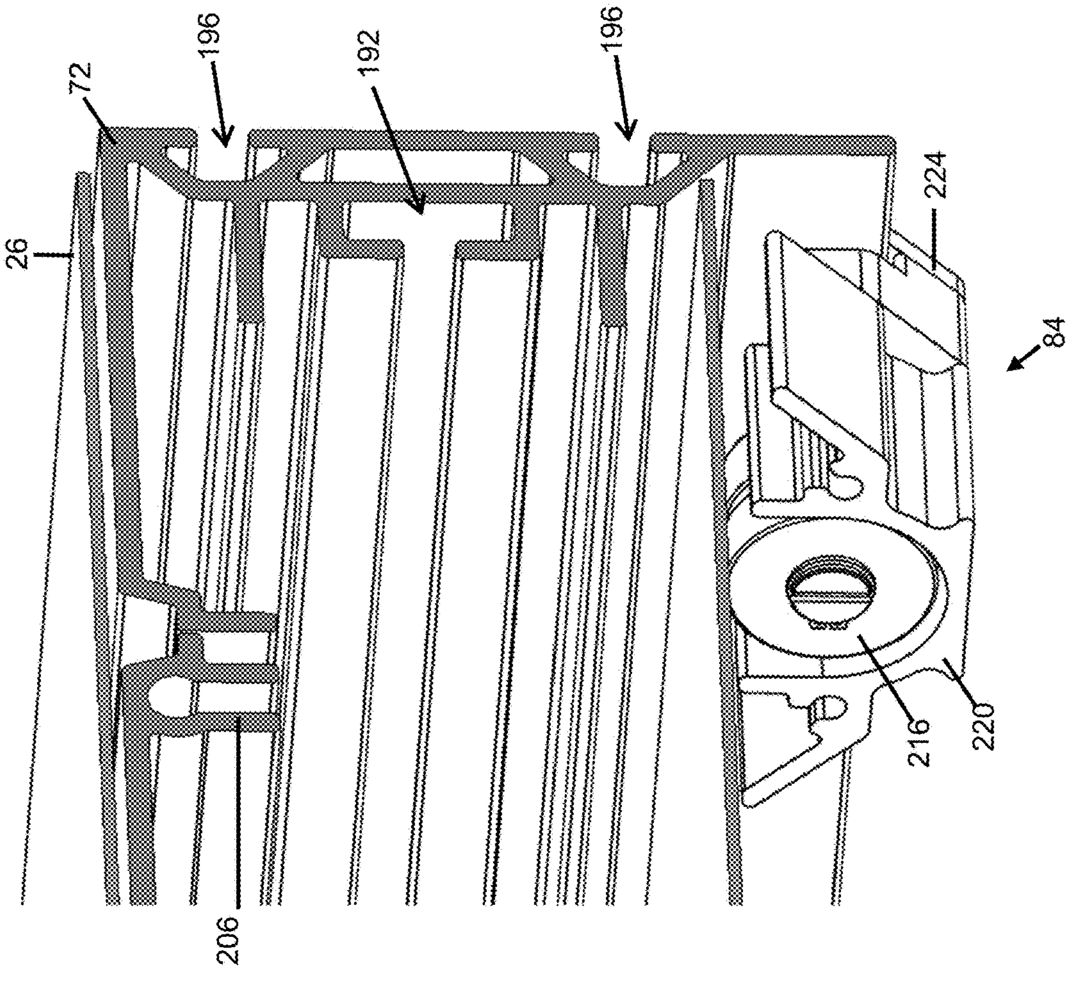
FIG. 12A illustrates a section view of the conveyor assembly where an idler assembly is placed.

FIGS. 12A-B illustrate the idler assembly 84. FIG. 12A illustrates a section view of the conveyor assembly where the idler assembly 84 is placed. FIG. 12B illustrates a perspective view of the idler assembly 84.

The plurality of idler assemblies 84 are coupled to the side rails 72 in pairs and are positioned on the underside of the conveyor assembly 10 opposite to the deck member 80. In operation, the pair of idler assemblies 84 are configured to limit sagging of the belt 26 on the underside of the conveyor assembly 10. The number of pairs of idler assemblies 84 are dependent on the length and material of the belt 26. The idler assemblies 84 comprise an idler 216, an idler housing 220, and a mounting plate 224.

The idler 216 is configured to support the belt 26 to prevent sagging. The idler 216 is also rotatable in response to the rotation of the belt 26.

The idler housing 220 is coupled to the mounting plate 224 and support the idler 216. The idler housing 220 is configured to not contact the belt 26.

The mounting plate 224 is coupled to the idler housing 220 and to one of the outer facing slots 196 of the side rails 72. Specifically, the mounting plate 224 is coupled to the outer facing slots 196 using the T-nuts 88 and the fasteners (not shown). In other embodiments, the mounting plate 224 may be coupled to more than one of the outer facing slots 196. In some implementations, the outer facing slots 196B, shown in FIG. 11, have the shape of outer facing slots 196, shown in FIG. 9.

The invention claimed is:

1. A conveyor assembly comprising:
- a frame assembly comprising:
  - a pair of side rails;
  - a plurality of cross brace members coupled to the side rails;
  - a plurality of deck members coupled to the plurality of cross brace members, the deck members positioned between the pair of side rails; and
- a tail assembly mounted at a first end of the frame assembly, the tail assembly comprising:
  - a pair of first side plates coupled to the side rails;
  - a pair of second side plates, where each of the second side plates is coupled to one of the first side plates, the second side plates are configured to selectively pivot with respect to the first side plates, where each of the second side plates define a slot arranged to receive a shaft; and
  - a plurality of tail pulleys rotatably coupled to the shaft, the plurality of tail pulleys being positioned between the second side plates; and
- a head assembly mounted at a second end of the frame assembly, the head assembly comprising:
  - a pair of bearing housings coupled to the side rails;
  - a plurality of head pulleys positioned between the pair of bearing housings;
  - a pair of bearings, where each bearing is partially received within one of the bearing housings; and
- the tail assembly further comprising:
  - a connecting member coupled to both of the second side plates;
  - a belt guide coupled to the connecting member.

2. The conveyor assembly according to claim 1, further comprising:
- a drive pulley hub coupled to one of the bearings and one of the head pulleys, the drive pulley hub further comprising:
  - a shaft configured to couple to a power source; and
  - a bearing receiving region partially receiving one of the bearings.

3. The conveyor assembly according to claim 2, further comprising:
- a guide pulley hub for receiving a guiding profile of a belt, the guide pulley hub being coupled to the head pulleys; and
- an end pulley hub coupled to one of the bearings and one of the head pulleys.

4. The conveyor assembly according to claim 3, wherein the drive pulley hub, the guide pulley hub and the end pulley hub are all coupled to the head pulleys via welding.

5. The conveyor assembly according to claim 4, wherein the head pulleys, the tail pulleys, the drive pulley hub, the guide pulley hub, and the end pulley hub all support the belt.

6. The conveyor assembly according to claim 2, wherein each of the head pulleys define an interior cavity.

7. The conveyor assembly according to claim 1, the tail assembly further comprising:
- a plurality of tensioning fasteners extending through the shaft and coupled to the second side plates,
- wherein the plurality of tensioning fasteners define an adjustment axis; and
- wherein the plurality of tensioning fasteners is configured to move the shaft along the adjustment axis.

8. The conveyor assembly according to claim 7, wherein the tensioning fasteners are set screws.

9. The conveyor assembly according to claim 1, wherein the deck members define a plurality of mounting slots spanning a length of the deck member, and wherein the mounting slots are configured to receive a plurality of self-tapping fasteners extending through the cross brace member.

10. The conveyor assembly according to claim 9, wherein a quantity of self-tapping fasteners extending through the cross brace member is twice or three times a quantity of deck members.

11. The conveyor assembly according to claim 1, wherein each of the first side plates comprise a top stop and a bottom stop arranged to limit a pivoting motion of the second side plates.

12. The conveyor assembly according to claim 11, wherein a maximum pivoting angle of the second side plates is between 200 degrees to 250 degrees.

13. The conveyor assembly according to claim 1, wherein at least one of the second side plates further comprises a user engagement member.

14. The conveyor assembly according to claim 1, wherein each of the plurality of deck members define a plurality of belt guide slots.

15. A conveyor assembly, comprising:
- a frame assembly comprising:
  - a pair of side rails;
  - a plurality of cross brace members coupled to the side rails;

a plurality of deck members coupled to the plurality of cross brace members, the deck members positioned between the pair of side rails; and a tail assembly mounted at a first end of the frame assembly, the tail assembly comprising:

a pair of first side plates coupled to the side rails;

a pair of second side plates, where each of the second side plates is coupled to one of the first side plates, the second side plates are configured to selectively pivot with respect to the first side plates, where each of the second side plates define a slot arranged to receive a shaft; and a plurality of tail pulleys rotatably coupled to the shaft, the plurality of tail pulleys being positioned between the second side plates;

a connecting member coupled to both of the second side plates; and a belt guide coupled to the connecting member.

16. The conveyor assembly according to claim 15, the tail assembly further comprising:

a plurality of tensioning fasteners extending through the shaft and coupled to the second side plates, wherein the plurality of tensioning fasteners define an adjustment axis; and wherein the plurality of tensioning fasteners is configured to move the shaft along the adjustment axis;

wherein each of the first side plates comprise a top stop and a bottom stop arranged to limit a pivoting motion of the second side plates;

wherein at least one of the second side plates further comprises a user engagement member; and wherein each of the plurality of deck members define a plurality of belt guide slots.

17. The conveyor assembly according to claim 15, further comprising:

a head assembly mounted at a second end of the frame assembly, the head assembly comprising:

a pair of bearing housings coupled to the side rails;

a plurality of head pulleys positioned between the pair of bearing housings;

a pair of bearings, where each bearing is partially received within one of the bearing housings; and the tail assembly further comprising:

a connecting member coupled to both of the second side plates;

a belt guide coupled to the connecting member;

a drive pulley hub coupled to one of the bearings and one of the head pulleys, the drive pulley hub further comprising:

a shaft configured to couple to a power source; and a bearing receiving region partially receiving one of the bearings; and a guide pulley hub for receiving a guiding profile of a belt, the guide pulley hub being coupled to the head pulleys; and an end pulley hub coupled to one of the bearings and one of the head pulleys.

18. A conveyor assembly comprising a frame assembly comprising:

a pair of side rails;

a plurality of cross brace members coupled to the side rails;

a plurality of deck members coupled to the plurality of cross brace members, the deck members positioned between the pair of side rails; and a tail assembly mounted at a first end of the frame assembly, the tail assembly comprising:

a pair of first side plates coupled to the side rails;

a pair of second side plates, where each of the second side plates is coupled to one of the first side plates, the second side plates are configured to selectively pivot with respect to the first side plates, where each of the second side plates define a slot arranged to receive a shaft;

wherein each of the first side plates comprise a top stop and a bottom stop arranged to limit a pivoting motion of the second side plates;

a plurality of tail pulleys rotatably coupled to the shaft, the plurality of tail pulleys being positioned between the second side plates a plurality of tensioning fasteners extending through the shaft and coupled to the second side plates, wherein the plurality of tensioning fasteners define an adjustment axis; and wherein the plurality of tensioning fasteners is configured to move the shaft along the adjustment axis.

19. The conveyor assembly according to claim 18, further comprising:

a head assembly mounted at a second end of the frame assembly, the head assembly comprising:

a pair of bearing housings coupled to the side rails;

a plurality of head pulleys positioned between the pair of bearing housings;

a pair of bearings, where each bearing is partially received within one of the bearing housings; and the tail assembly further comprising:

a connecting member coupled to both of the second side plates;

a belt guide coupled to the connecting member;

a drive pulley hub coupled to one of the bearings and one of the head pulleys, the drive pulley hub further comprising:

a shaft configured to couple to a power source; and a bearing receiving region partially receiving one of the bearings; and a guide pulley hub for receiving a guiding profile of a belt, the guide pulley hub being coupled to the head pulleys;

an end pulley hub coupled to one of the bearings and one of the head pulleys.

* * * * *